United States Patent [19]
Shaffer et al.

[11] Patent Number: 6,130,935
[45] Date of Patent: *Oct. 10, 2000

[54] VIRTUAL NETWORKING WORK AT HOME SYSTEM AND METHOD

[75] Inventors: Franklin O'dell Shaffer, Herndon, Va.; Francine R. Brailsford, Silver Spring, Md.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/695,248

[22] Filed: Aug. 8, 1996

[51] Int. Cl.$^7$ .................................................. H04M 15/00
[52] U.S. Cl. ........................ 379/127; 379/114; 379/121; 379/144; 379/229
[58] Field of Search .......................... 379/229, 111–115, 379/144, 200, 216, 355, 95, 289, 127, 201, 207, 220, 221, 117, 118, 120, 121, 126, 130, 134, 140, 230

[56] References Cited

U.S. PATENT DOCUMENTS

| | | | |
|---|---|---|---|
| 4,348,554 | 9/1982 | Asmuth . | |
| 4,661,974 | 4/1987 | Bales et al. | 379/198 |
| 4,802,199 | 1/1989 | Lange et al. | 379/221 |
| 4,924,500 | 5/1990 | Lewis et al. | 379/201 |
| 4,953,203 | 8/1990 | Shepard | 379/207 |
| 4,982,421 | 1/1991 | Kirsch et al. | 379/216 |
| 4,993,014 | 2/1991 | Gordon . | |
| 5,008,929 | 4/1991 | Olsen et al. | 379/115 |
| 5,036,535 | 7/1991 | Gechter et al. | 379/210 |
| 5,109,408 | 4/1992 | Greenspan et al. | 379/197 |
| 5,168,515 | 12/1992 | Gechter et al. | 379/265 |
| 5,212,691 | 5/1993 | Hokari . | |
| 5,247,571 | 9/1993 | Kay et al. | 379/207 |
| 5,271,058 | 12/1993 | Andrews et al. | 379/210 |
| 5,282,244 | 1/1994 | Fuller et al. | 379/230 |
| 5,479,494 | 12/1995 | Clitherow | 379/112 |
| 5,524,142 | 6/1996 | Lewis et al. | 379/114 |
| 5,572,579 | 11/1996 | Orriss et al. | 379/115 |
| 5,583,926 | 12/1996 | Venier et al. | 379/229 |
| 5,666,405 | 9/1997 | Weber | 379/114 |
| 5,699,416 | 12/1997 | Atkins | 379/127 |
| 5,729,598 | 3/1998 | Kay | 379/114 |

*Primary Examiner*—Curtis A. Kuntz
*Assistant Examiner*—Binh K. Tieu

[57] ABSTRACT

A system and method for virtual networking work at home provides the capability to bill business calls from an employee's home telephone to the business and to bill personal calls from the same telephone to the employee. Upon entry of an access code by a caller, a second dial tone is presented to the caller, who then dials the desired virtual network station number. A signaling message containing the dialed number and the ANI of the calling station is sent to a service control point which translates the dialed number and ANI to corresponding numbers. The dialed number is translated to a telephone number which allows the call to be completed to the desired virtual network station. The ANI is translated to a number which allows correct billing of the call. The call is then presented to an inter-exchange carrier network which completes and bills the call, using the translated numbers. This allows virtual network work-at-home stations to be located anywhere in the country.

21 Claims, 3 Drawing Sheets

FIG. 3a

| 306 Other Information | 300 Collect Digits TCAP Message | |
|---|---|---|
| | 302 Dialed Number | 304 ANI | 306 Other Information |

FIG. 3b

| 306 Other Information | 300 Collect Digits TCAP Message - Before Translation | |
|---|---|---|
| | 302 Dialed Number: 1234 | 304 ANI: (505) 555-2222 | 306 Other Information |

FIG. 3c

| 306 Other Information | 300 Collect Digits TCAP Message - After Translation | |
|---|---|---|
| | 302 Dialed Number: (700) 555-1234 | 304 ANI: (515) 555-2525 | 306 Other Information |

– 6,130,935 –

VIRTUAL NETWORKING WORK AT HOME SYSTEM AND METHOD

BACKGROUND OF THE INVENTION

1. Field of the Invention

The present invention relates a system and method for providing virtual network services to non-dedicated telephone stations in a virtual network having geographically diverse stations.

2. Background Information

Virtual networking allows telephone stations at multiple locations to be dialed as though they were at one location. In order to gain access to a virtual network service, each telephone station must indicate to the network that virtual network service is desired. For telephone stations dedicated to the virtual network, such as those located in business offices, there are two types of indicators or triggers which provide acceptable service: dedicated access lines and automatic number identification (ANI). In either case, all calls generated from a particular station are billed as virtual network calls. However, a problem arises where the use of non-dedicated telephone stations, such as those to be used in a work-at-home environment, is desired. If the work-at-home employee has only one telephone line, the telephone station on that line will be dedicated to the virtual network and all calls made on that line will be billed to the virtual network. Thus, the business will be paying for all of the employee's personal calls. One solution to this problem is to install a second telephone line at the home of each work-at-home employee. This is a costly solution because the business must pay monthly charges for each line installed, even if it is only used occasionally. What is needed is a way to bill business calls from an employee's home telephone to a business and to bill personal calls from the same telephone to the employee.

In U.S. Pat. No. 5,247,571 to Kay et al., a work at home service is offered in conjunction with an area-wide Centrex service. The service logic which processes a call is contained in the local exchange environment. This system allows a work-at-home caller to dial an access code in order to gain access to business Centrex services. When the local switch connected to the originating station detects the access code, it queries a service control point which matches the originating station number to a corresponding business number of a Centrex group. The local exchange carrier network then processes the call as though it originated from the corresponding business number. This service is limited in operation to the area served by the local exchange carrier, that is, all stations must be connected to the same local exchange carrier in order to use the service.

A need arises for a work-at-home service which allows stations to be located anywhere in the country.

SUMMARY OF THE INVENTION

A system and method for virtual networking work at home provides the capability to bill business calls from an employee's home telephone to the business and to bill personal calls from the same telephone to the employee. Upon entry of an access code by a caller, a second dial tone is presented to the caller, who then dials the desired virtual network station number. A signaling message containing the dialed number and the ANI of the calling station is sent to a service control point which translates the dialed number and ANI to corresponding numbers. The dialed number is translated to a telephone number which allows the call to be completed to the desired virtual network station. The ANI is translated to a number which allows correct billing of the call. The call is then presented to an inter-exchange carrier network which completes and bills the call, using the translated numbers. This allows virtual network work-at-home stations to be located anywhere in the country.

BRIEF DESCRIPTION OF THE DRAWINGS

FIG. 3 is an exemplary format of a collect digits message 300.

DETAILED DESCRIPTION OF THE INVENTION

Figure 1:
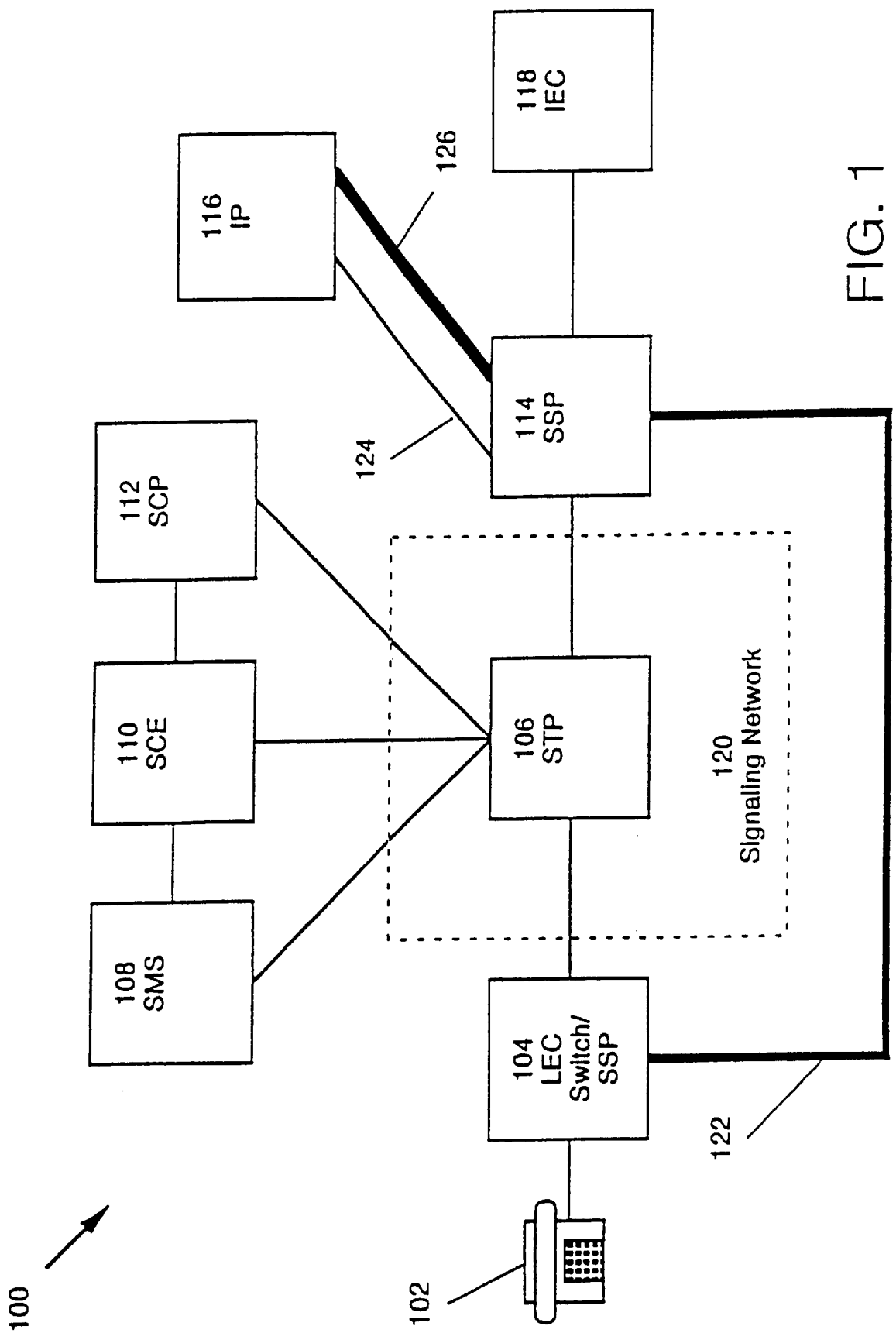
FIG. 1 is a block diagram of a telephone network 100 in accordance with the present invention.

FIG. 1 is a block diagram of a telephone network 100 in accordance with the present invention. A work-at-home telephone station 102 is connected to local exchange carrier switch 104. Switch 104 is an enhanced switch known as a service switching point (SSP). An SSP is a telephone switch that can recognize certain trigger events that may occur in processing a call. When such a trigger event is recognized, the SSP will suspend processing of the call and will communicate with another device, such as a service control point, typically in order to obtain additional information needed to complete processing of the call. Communication is accomplished over a telecommunications signaling network, such as, for example, ANSI SS7, ITU CCS7 or X.25. In North America, SS7 is the signaling network in exclusive use. Therefore, the embodiment which is described here uses SS7. However, the present invention is equally applicable to other signaling networks, with the appropriate minor modifications which would be apparent to one of skill in the art.

SSP 104 is connected to signal transfer point (STP) 106, which is a special purpose packet switch for signaling messages in SS7 network 120. STP 106 routes signaling messages between network devices. For example, STP 106 routes signaling messages between SSP 104 and other devices, such as service management system (SMS) 108, service creation environment (SCE) 110 and service control point (SCP) 112. SMS 108 is a computer system that supports the operations, administration, maintenance and provisioning (OAM&P) needs of the telecommunications network. SMS 108 receives signaling messages relating network events affecting OAM&P, processes them and provides formatted information allowing OAM&P to be easily comprehended and controlled. SCE 110 is a software development environment, running on one or more network computer systems, which allows creation of network service logic programs which implement various network features and processes, such as the process of the present invention. SCP 112 is a network based computerized database system which is used to provide advanced services in the telecommunications network. SCP 112 contains service logic and associated data for services such as, for example, calling cards, virtual networks and personal telephone numbers.

STP 106 is also connected to SSP 114, which is an enhanced LEC switch similar to SSP 104. SSP 114 is used to interface the LEC network to interexchange carrier (IEC) network 118. SSP 114 is communicatively connected through SS7 network 120 to SSP 104. SSP 114 is also connected by audio trunks 122 to SSP 104. Trunks 122 allow calls at SSP 104 to be routed to SSP 114, while the signaling information needed to route and control those calls is communicated over SS7 network 120. SSP 114 is also connected by data link 124 and audio link 126 to intelligent peripheral (IP) 116. IP 116 is used to facilitate customer interaction. For example, IP 116 may prompt the customer to press keys on the telephone set or may record voice messages to or from the customer.

Figure 2:
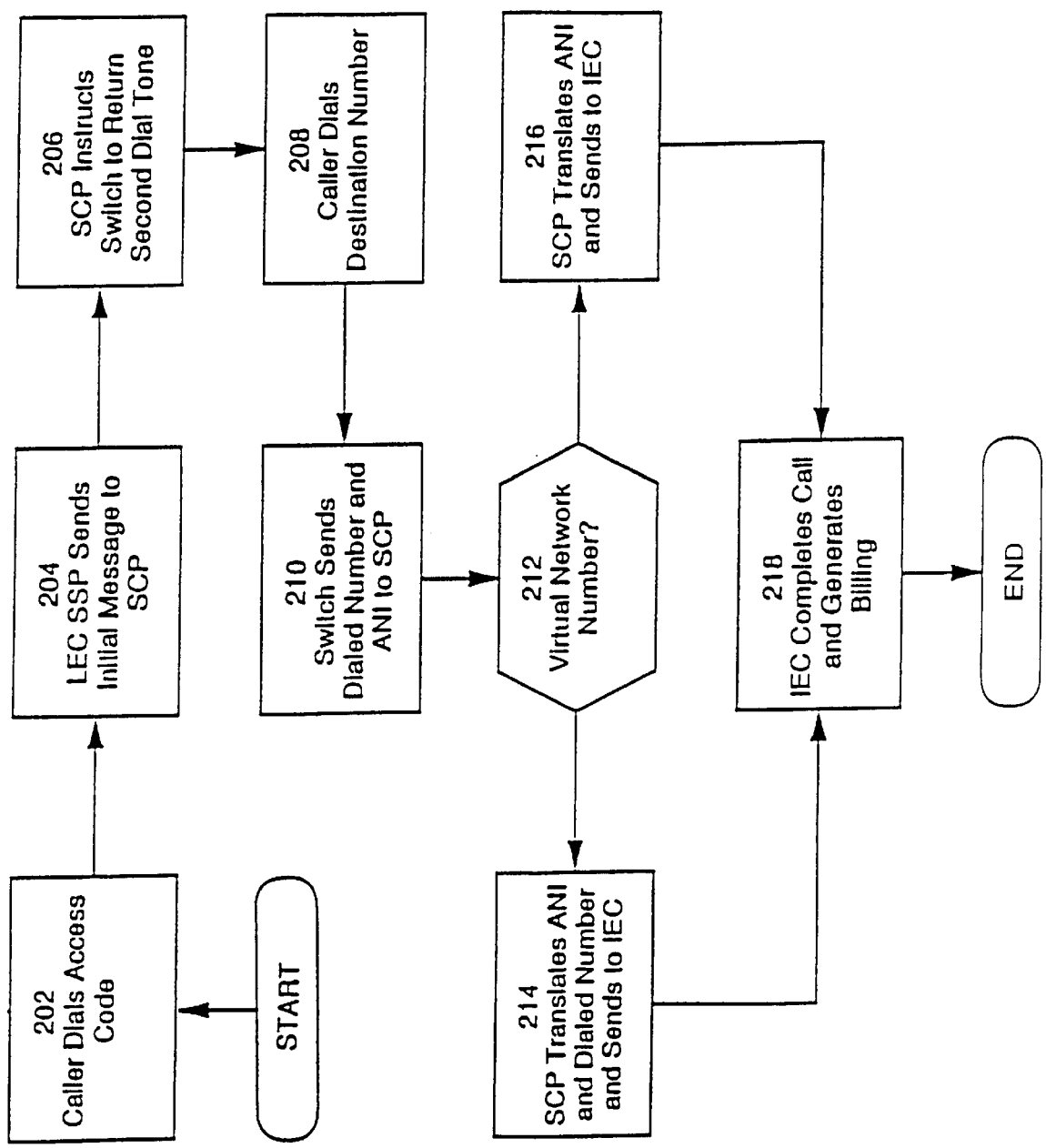
FIG. 2 is a flow diagram of a process 200 which implements the present invention in the network of FIG. 1.

FIG. 2 is a flow diagram of a process 200 which implements one embodiment of the present invention in the network of FIG. 1. It is best viewed in conjunction with FIG. 1. The process begins in step 202, in which a caller at station 102 dials an access code, such as, for example "*99" or "*8". In step 204, the access code is received by IEC SSP 104, which recognizes it as a virtual network access code, suspends the call temporarily and sends an initial message to SCP 112. If the caller has dialed anything other than the virtual network access code, LEC SSP 104 processes the call as a personal call from the caller's station, in accordance with well-known standard call processing. In step 206, SCP 112 receives the initial message, recognizes it as a request for virtual network service, and responds with a message instructing SSP 104 to provide a second dial tone to the caller.

In step 208, SSP 104 provides the second dial tone and the caller dials a destination number. The caller may dial a virtual network number, which initiates a call to a destination station which is also part of the same virtual network to which the caller's station belongs. The virtual network number may be any number of digits less than ten, but typically would be from three to seven digits in length. In order to alert SSP 104 that all digits have been dialed, the caller would then dial a termination code, such as, for example, "*" or "#". The termination code is necessary because the caller may also dial a ten digit number, which initiates a long distance call to a non-virtual network number. In step 210, SSP 104 again suspends the call and sends a collect digits message containing the dialed number and the ANI to SCP 112.

In step 212, SCP 112 examines the dialed number and determines whether the destination of the call is a virtual network station, indicated by a dialed number of less than ten digits, or a non-virtual network station, indicated by a dialed number of ten digits. If the destination of the call is a virtual network station, the process goes to step 214, in which SCP 112 accesses its database and locates a first translated number corresponding to the dialed number and a second translated number corresponding to the ANI. SCP 112 then replaces the dialed number and the ANI in the collect digits message with their corresponding translated numbers and sends the message to IEC 118. If the destination of the call is a non-virtual network station, the process goes to step 216, in which SCP 112 accesses it database and locates a translated number for the ANI only. SCP 112 then replaces the ANI in the collect digits message with its corresponding translated number and sends the message to IEC 118. Both steps 214 and 216 then go to step 214, in which IEC 118 receives the collect digits message and acts upon the call based on the dialed number and ANI present in the message. IEC 118 routes the call to the appropriate destination station, whether part of the virtual network or not, and the call is also billed appropriately.

Based on the received ANI, the IEC can distinguish between a virtual network call and a personal call made from the same telephone station. The two types of calls can then be treated differently, including different requirements for the number of dialed digits, different features, and different billing accounts, etc. In the embodiment of FIG. 2, both the ANI and the dialed number are translated. In another embodiment, only the ANI is translated. The translated ANI and the untranslated dialed number are then sent to the IEC, which processes the dialed number itself.

In conventional call processing, the ANI associated with a call is used to indicate the number to which the call is to be billed, termed the billing number. The ANI typically indicates the normal telephone number of the station originating the call. In the present invention the ANI is translated to indicate a different billing number than the normal telephone number. The number of a virtual network station is substituted for the original ANI. Thus, the virtual network station number becomes the billing number and the call is billed to that number.

Likewise, in conventional call processing, the dialed number is presented unaltered to the IEC as the number to which the call is to be completed. The IEC completes the call to this number in the conventional way. If the dialed number is a special service number, such as an "800" number, the IEC performs well-known translation on the dialed number to obtain a geographic routing number. In the present invention, if the dialed number is a virtual network station number, the dialed number is translated to a corresponding conventional number before the call is presented to the IEC. The IEC then completes the call to the conventional number presented to it in the conventional way.

Translation of the ANI is relatively straightforward. For example, if station 102 has the number "(505) 555-5555", this number would be present in the ANI field of the message as received by SCP 112. SCP 112 would simply search the database using the number in the ANI field as a key and obtain the corresponding billing number. The particular translation depends on the location of the billing number. If the billing number is located on the same exchange, the translated number would be, for example "(505) 555-2222". If the billing number is not on the same exchange, but is within the same area code, the translated number would be, for example, "(505) 222-2222". If the billing number was not in the same area code, the translated number would be, for example, "(222) 555-2222".

Translation of the dialed number is somewhat more complex. The number of digits the caller would dial depends upon the configuration of the virtual network. Typically, seven digits would be dialed, but three or four would also be common. In one embodiment, in which unique seven digit numbers are used, translation might be as simple as prepending a particular area code onto the dialed number. For example, if the caller had dialed "123-4567", SCP 112 would simply prepend the appropriate area code, such as "700", producing the number "(700)123-4567". In another embodiment, the access code, the ANI, or both would be used to identify the particular virtual network in use. A database partition for the identified virtual network would then be accessed and the dialed number used to locate the corresponding translated number. For example, if the station 102 has the number "(505) 555-5555", SCP 112 would locate this number in its database and obtain an identifier of the particular virtual network to which station 102 belongs, for example network X. SCP 112 would then access the database partition for network X. If, for example, the caller had dialed "1234", the SCP would then locate the entry in the database corresponding to "1234" and obtain the corresponding translated number contained in the entry. This number might be, for example, "(515) 555-5225".

IEC 118 would then complete the call to translated number of the dialed number, for example, "(515) 555-

5225" and bill the call to the translated number of the ANI, for example, "(222) 555-2222". If the translated number is a special-service number, such as, for example, "(700) 123-4567", the EC network would perform additional processing and translation to obtain the ultimate destination of the call, as is well known to those of skill in the art.

If the dialed number is ten digits in length, this would indicate to the SCP that the dialed number is not to be translated, but rather transmitted to the EC untranslated. In another embodiment, the access code, the ANI or both would indicate to the SCP that the dialed number is not to be translated, but rather transmitted to the IEC untranslated. In either case, the IEC would process the untranslated dialed number itself, either translating the dialed number and completing the call, or completing the call directly to the untranslated dialed number.

The signaling message received by EC 118, after it has been modified by SCP 112, is exactly the same as if the message had been generated in response to a call from a dedicated virtual network station. Therefore, once the message has been received, IEC 118 treats the call the same as if it had originated at a dedicated virtual network station. This includes not only billing and call completion, as discussed above, but also any special features implemented by the virtual network system, such as, for example, call waiting, call forwarding, voice messaging, etc. One such special feature is known as distinctive ringing. This feature causes the ringing signal at a destination station which is part of the virtual network to vary depending on the origination of the call. If the call originates from the virtual network to which the destination station belongs, a special ringing tone or signal is used to alert the recipient of the call to that fact. If the call originates outside the virtual network to which the destination station belongs, the standard ringing tone or signal is used to indicate a personal call is incoming. Distinctive tones or signals may also be applied to other special features, such as a call waiting indicator or a voice message indicator.

FIG. 3a is an exemplary format of a collect digits message 300. Message 300 contains dialed number field 302 and ANI field 304, as well as other information fields 306. Further information may be obtained by reference to the ANSI specification for the SS7 TCAP collect digits message.

FIG. 3b is an example of an untranslated collect digits message as received by the SCP. In this example, the dialed number is "1234" and the ANI is "(505) 555-2222".

FIG. 3c is an example of a translated collect digits message as transmitted from the SCP to the IEC. In this example, the dialed number has been translated to "(700) 555-1234" which indicates the number to which the call is to be completed. Because "700" numbers are special service numbers, the dialed number will be further processed by the IEC in order to complete the call. The ANI has been translated to "(515) 555-2525". This number identifies the virtual network station to which the call will be billed.

Although specific embodiments have been described, it will be seen by one of skill in the art that other embodiments which are equivalent are possible.

What is claimed is:

1. A virtual networking system for completing a call from an originating telephone station to a telecommunication network, the system comprising:
   a receiver for receiving an input signaling message comprising an indicator of the originating telephone station and an indicator of a destination virtual network station;
   a billing number translator for translating the indicator of the originating telephone station to a corresponding indicator of a billing station to which the call is to be billed;
   a destination translator for translating the indicator of a destination virtual network station to a corresponding indicator of a destination telephone station to which the call is to be completed;
   a signaling message generator for generating an output signaling message containing the corresponding indicator of the billing station to which the call is to be billed in place of the indicator of the originating telephone station, and the corresponding indicator of the destination telephone station in place of the indicator of the destination virtual network station; and
   a transmitter for transmitting the output signaling message to the telecommunication network, such that the call is completed to the destination telephone station and is billed to the billing station instead of the originating telephone station.

2. The system of claim 1, wherein the indicator of the originating telephone station is an automatic number identification for the originating telephone station.

3. The system of claim 1, wherein the indicator of the destination virtual network station is a dialed number.

4. A virtual networking system connected to an originating station and an interexchange carrier network, the system comprising:
   a service switching point, responsive to origination of a call from the originating network station, for generating a signaling message comprising an originating indicator of an originating number and a dialed indicator of a virtual network station and for transmitting the signaling message to a service control point; and
   a service control point, responsive to receipt of the signaling message, for translating the originating indicator to a corresponding billing indicator of a billing number to which the call is to be billed, translating the dialed indicator to a corresponding destination indicator of the destination number to which the call is to be completed, modifying the signaling message by replacing the originating indicator in the signaling message with the billing indicator and by replacing the dialed indicator with the destination indicator, and transmitting the modified signaling message to the interexchange carrier network,
   such that the call is completed to the destination number and is billed to the billing number instead of the originating number.

5. The system of claim 4, wherein the signaling message is an SS7 TCAP collect digits message.

6. The system of claim 4, wherein the originating indicator is an automatic number identification for a telephone station.

7. The system of claim 4, wherein the call is originated from a non-dedicated virtual network station by entry at the non-dedicated station of the dialed indicator.

8. The system of claim 7, wherein the dialed indicator is an access code and a virtual network station number.

9. A method of completing a call in a virtual telecommunication network from an originating telephone station to an interexchange carrier network, the method comprising the steps of:
   receiving, at a service control point, an input signaling message containing an indicator of the originating telephone station and an indicator of a destination virtual network station;

translating the indicator of the originating telephone station to a corresponding indicator of a station to which the call is to be billed and the indicator of a destination virtual network station to a corresponding indicator of a destination telephone station to which the call is to be completed;

generating an output signaling message comprising the corresponding indicator of a billing station to which the call is to be billed in place of the indicator of the originating telephone station and the corresponding indicator of a destination telephone station in place of the indicator of the destination virtual network station; and, transmitting the output signaling message to the interexchange carrier network, such that the call is completed to the destination telephone station and is billed to the billing station instead of the originating telephone system.

10. The method of claim 9, wherein the indicator of the originating telephone station is an automatic number identification for the originating telephone station.

11. The method of claim 9, wherein the indicator of the destination virtual network station is a dialed number.

12. A method of completing a call in a virtual telecommunication network from an originating station to an interexchange carrier network, the method comprising the steps of:

receiving, at a service switching point, an access code dialed by a caller at the originating station;

transmitting, from the service switching point to a service control point, a signaling message indicating receipt of the access code;

recognizing, at the service control point, the access code and transmitting, from the service control point to the service switching point, a signaling message instructing the service switching point to present a second dial tone to the caller;

receiving, at the service switching point, a dialed number from the caller;

transmitting, from the service switching point, a signaling message indicating an originating station number and the dialed number;

responsive to receiving the signaling message at the service control point, modifying the signaling message by performing the steps of:

translating the originating number to a corresponding billing number and replacing the originating number in the signaling message with the billing number;

if the dialed number is a virtual network station number, translating the dialed number to a corresponding destination number and replacing the dialed number in the signaling message with the destination number;

presenting the call, including the modified signaling message, to the interexchange carrier;

billing the call to the billing number; and completing the call to the destination number.

13. The method of claim 12, wherein the originating station number is indicated by an automatic number identification in the signaling message.

14. The system of claim 1, wherein the call is originated from a non-dedicated virtual network station by entry at the non-dedicated station of the indicator of a destination virtual network station.

15. The system of claim 1, wherein the indicator of a destination virtual network station is an access code and a virtual network station number.

16. The system of claim 1, wherein the signaling message is an SS7 TCAP collect digits message.

17. The method of claim 9, wherein the signaling message is an SS7 TCAP collect digits message.

18. The method of claim 11, wherein the call is originated from a non-dedicated virtual network station by entry at the non-dedicated station of the dialed number.

19. The method of claim 18, wherein the dialed number is an access code and a virtual network station number.

20. The method of claim 12, wherein the call is originated from a non-dedicated virtual network station by entry at the non-dedicated station of the access code and the virtual network station number.

21. The method of claim 12, wherein the signaling message is an SS7 TCAP collect digits message.

* * * * *